US008781821B2

(12) United States Patent
Newman

(10) Patent No.: US 8,781,821 B2
(45) Date of Patent: Jul. 15, 2014

(54) VOICED INTERVAL COMMAND INTERPRETATION

(75) Inventor: David Edward Newman, Temecula, CA (US)

(73) Assignee: Zanavox, Temecula, CA (US)

( * ) Notice: Subject to any disclaimer, the term of this patent is extended or adjusted under 35 U.S.C. 154(b) by 284 days.

(21) Appl. No.: 13/459,584

(22) Filed: Apr. 30, 2012

(65) Prior Publication Data

US 2013/0290000 A1 Oct. 31, 2013

(51) Int. Cl.

| | |
|---|---|
| ***G10L 11/06*** | (2006.01) |
| ***G10L 19/00*** | (2013.01) |
| ***G10L 19/12*** | (2013.01) |
| ***G10L 19/14*** | (2006.01) |
| ***G10L 21/02*** | (2013.01) |
| ***G10L 15/20*** | (2006.01) |
| ***G10L 15/06*** | (2013.01) |
| ***G10L 15/26*** | (2006.01) |
| ***G10L 21/00*** | (2013.01) |

(52) U.S. Cl.

USPC ........... 704/214; 704/215; 704/219; 704/221; 704/223; 704/225; 704/226; 704/227; 704/228; 704/233; 704/243; 704/235; 704/246; 704/244; 704/275

(58) Field of Classification Search

USPC ......... 704/214, 215, 219, 221, 223, 225, 226, 704/227, 228, 233, 243, 235, 246, 244, 275

See application file for complete search history.

(56) References Cited

U.S. PATENT DOCUMENTS

| | | | | |
|---|---|---|---|---|
| 4,359,604 | A * | 11/1982 | Dumont | 704/233 |
| 4,531,228 | A * | 7/1985 | Noso et al. | 704/275 |
| 4,597,098 | A * | 6/1986 | Noso et al. | 704/233 |
| 4,610,023 | A * | 9/1986 | Noso et al. | 704/233 |
| 5,737,407 | A * | 4/1998 | Graumann | 379/388.04 |
| 5,960,395 | A * | 9/1999 | Tzirkel-Hancock | 704/241 |
| 6,249,757 | B1 * | 6/2001 | Cason | 704/214 |
| 6,381,570 | B2 * | 4/2002 | Li et al. | 704/233 |
| 6,633,841 | B1 * | 10/2003 | Thyssen et al. | 704/233 |
| 6,820,056 | B1 | 11/2004 | Harif | |
| 6,847,930 | B2 * | 1/2005 | Domer et al. | 704/233 |
| 7,016,832 | B2 * | 3/2006 | Choi | 704/208 |
| 7,027,991 | B2 * | 4/2006 | Alexander et al. | 704/275 |
| 7,231,348 | B1 * | 6/2007 | Gao et al. | 704/233 |
| 7,523,038 | B2 * | 4/2009 | Ariav | 704/275 |
| 7,756,709 | B2 * | 7/2010 | Gierach | 704/253 |
| 7,912,230 | B2 * | 3/2011 | Kawamura et al. | 381/93 |
| 8,478,587 | B2 * | 7/2013 | Kawamura et al. | 704/226 |
| 2005/0108004 | A1 * | 5/2005 | Otani et al. | 704/205 |
| 2005/0259834 | A1 * | 11/2005 | Ariav | 381/110 |

* cited by examiner

*Primary Examiner* — Edgar Guerra-Erazo

(57) ABSTRACT

A method is disclosed for controlling a voice-activated device by interpreting a spoken command as a series of voiced and non-voiced intervals. A responsive action is then performed according to the number of voiced intervals in the command. The method is well-suited to applications having a small number of specific voice-activated response functions. Applications using the inventive method offer numerous advantages over traditional speech recognition systems including speaker universality, language independence, no training or calibration needed, implementation with simple microcontrollers, and extremely low cost. For time-critical applications such as pulsers and measurement devices, where fast reaction is crucial to catch a transient event, the method provides near-instantaneous command response, yet versatile voice control.

12 Claims, 7 Drawing Sheets

7a: Voice-activated Counter

7b: Voice-activated Caliper

7c: Voice-activated Scale

7d: Voice-activated Timer

7e: Voice-activated Pulser

7f: Voice-activated Voltmeter

VOICED INTERVAL COMMAND INTERPRETATION

BACKGROUND OF THE INVENTION

The invention relates to voice-activation technology, and particularly to means for interpreting spoken commands by demarking time intervals with and without voiced sound.

Voice-activation is an exciting, emerging technology. Unfortunately, the current art in speech recognition offers little support for single-purpose devices. A wide range of potential applications, particularly in test and measurement instrumentation, require only two or three specific operations under voice control. Currently such devices have no economic path to commercialization because full speech recognition is far too expensive and cumbersome. Many voice-activated systems require a link to remote supercomputers, further increasing the cost and complexity.

Another problem with current voice-activation technology is its slow response time. Many special-purpose applications require a very fast response, especially when the response triggers a measurement. For example, a voice-activated pulse generator that triggers an oscilloscope would require a near-instantaneous command response so that the user can capture a transient event. Current speech recognition routines cannot provide a quick trigger because of the time needed to perform the speech recognition.

Another big problem is command interpretation error. Prior systems are notoriously error-prone. Systems dependent on speech recognition software often confuse one command for another, or interpret a background noise for a command. Even after a tedious "training" process, current speech recognition systems routinely misinterpret commands, or miss them completely, for no apparent reason. Moreover, speech recognition systems are necessarily speaker-dependent and are susceptible to complex backgrounds such as those often found in office and laboratory environments.

What is needed is a way to recognize just two or three simple commands, economically and without annoyance, and generate a fast responsive action according to the command. Preferably the new technology would include versatile noise-rejection strategies, robust instantaneous command-recognition steps, and true speaker universality regardless of intonation or accent or language—and without "training". The new technology would enable voice control over many useful specific-function devices, while avoiding the expense and complexity of speech recognition software or expensive links to remote supercomputers. Such a technology would enable voice-activated counting, interval timing, pulse generation, voltage measurement, size and distance measurement, weighing, and a host of other test and control devices that are not economically or technically feasible with current technology.

BRIEF SUMMARY OF THE INVENTION

The invention is a method for interpreting a spoken command by detecting intervals with voiced sound, separated by intervals with substantially less sound, and then performing a responsive action that depends on how many separate voiced intervals are detected. For applications involving a small number of responses, typically just two or three specific actions, the inventive method has been shown to be effective, economical, and extremely fast. The inventive method is simple enough to implement using a low-cost microcontroller, yet versatile enough to enable voice-controlled data acquisition devices.

The inventive spoken command is any utterance by a user with intent of producing a specific responsive action. A voiced interval is a time interval in which voiced sound is detected. A voiced sound is the relatively loud sound produced when vowels or open consonants such as "w" and "y" are spoken. Intermediate consonants such as "j", "l", "r", "m", "n", "v", and "z" may also be voiced, although usually with less sound amplitude than the vowel sounds. A non-voiced interval is a time interval wherein no voiced sounds are detected. A non-voiced interval may include silence or non-voiced sounds, including plosive consonants such as "b", "d", "g", "k", "p", and "t", or fricatives such as "f", "s", "h", "ch", "sh" and the like.

The inventive responsive action is any electronic or mechanical change or activity, performed consequent to the spoken command. A responsive action may also be no action, or simply proceeding with the next step in command processing. Typically several different responsive actions are possible, and the inventive method selects one specific responsive action from all the possible responsive actions, depending on the number of voiced intervals detected in the command. Interpreting the command means selecting which specific responsive action the command refers to. Interpreting the command may also include activating or performing the selected responsive action.

The inventive command interpretation includes detecting the voiced and non-voiced intervals that comprise the spoken command, and then performing a first responsive action if the command has exactly one voiced interval, and performing a second responsive action different from the first responsive action, if the command comprises a voiced interval followed by a non-voiced interval followed by a second voiced interval. The method may also perform a third responsive action if the command comprises three voiced intervals separated by two non-voiced intervals, and so forth. A command having a single voiced interval may be termed a type-1 command, which causes a type-1 responsive action to be performed. A command having two voiced intervals separated by a non-voiced interval is a type-2 command, which causes a type-2 responsive action. A command with three voiced intervals separated by two non-voiced intervals is a type-3, and so forth.

An advantage of the inventive method is that it enables any spoken command to be interpreted, whether the command is a word or phrase in any language, or even a nonsense sound, so long as the command has at least one voiced interval. Examples of type-1 commands are "go", "start", "stop", "set", which have exactly one voiced interval. Examples of type-2 commands are "reset" and "backup" and "lock it", each of which has two voiced intervals separated by a brief non-voiced interval. A type-3 command has three voiced intervals such as "quantify", "replicate", and "stop output". The inventive method has been shown to reliably interpret commands with up to eight voiced intervals when alternated with non-voiced intervals.

Voiced intervals are not merely syllables because, in many words and phrases, the syllables are parsed differently from the voiced intervals. For example, the word "narrow" has two syllables but only one voiced interval because the interior "rr" is strongly voiced; hence a single voiced sound extends throughout the word. The inventive method determines the command type according to the number of voiced intervals, which may or may not correspond to the number of syllables in the command.

The invention includes means for emphasizing the voiced sounds and suppressing the non-voiced sounds, to more clearly delineate voiced intervals in the command. Since non-voiced consonants typically have higher frequencies than voiced sounds, the inventive method may include a step of emphasizing sounds in a frequency band corresponding to voiced sounds, or suppressing sounds with frequencies outside that band.

The inventive method includes detecting certain periods of silence or non-voiced sound. The method may include detecting an initial silent period to ensure that all prior commands have finished. The method includes detecting non-voiced intervals occurring between the voiced intervals to indicate when each voiced interval starts and ends. There is also a silent period after the command ends; however it is usually not necessary to detect the final silent period, because at that time it is already known how many voiced intervals are in the command.

The inventive method includes steps to accommodate commands having multiple voiced intervals that have different sound amplitudes, or multiple non-voiced intervals with different durations. An example of a command that has different sound amplitudes is the type-2 command "reset". Most people put emphasis on the first voiced interval, then unintentionally fade on the second voiced interval, as in "REE-set". Likewise many type-3 commands are pronounced with non-voiced intervals of different durations. The inventive method includes means for compensating or disregarding such variations, sufficient to enable correct counting of the separate voiced intervals.

The inventive method includes steps for detecting sound waves comprising the spoken command. Usually the sound waves are first converted into electrical signals using a microphone or other transducer. Optionally, and preferably, the signals are then amplified and filtered to emphasize sounds in a frequency band corresponding to voiced sounds, while suppressing frequencies outside that band, and particularly suppressing any sounds with the high frequencies of non-voiced consonants. Just as the sound waves include positive and negative pressure variations, the amplified and filtered signals exhibit positive and negative voltage excursions relative to a mean voltage V0 that corresponds to silence. The electronic signal also exhibits small continuous variations, even in complete silence, due to electronic noise. Optionally, the signals may be rectified and low-pass filtered to further reject noise. Rectified sound signals are unipolar, having only one polarity of excursion. Any electrical voltage variations associated with the sound waves, including the output of microphones, amplifiers, filters, and rectifiers, will be referred to as the "sound signal" or "sound signals" hereinafter, unless otherwise distinguished.

Sound is detected by comparing the sound signal to a predetermined threshold voltage. The sound signal and V0 and the various threshold voltages are referenced to a system ground. The mean silent voltage V0 may or may not be zero volts relative to the system ground; in fact it may be any voltage depending on biasing. The sound waves of a spoken command cause the sound signal to vary above and below V0, and the amplitude of such excursions is related to the loudness of the sound. It is convenient to distinguish between a threshold value and a threshold voltage. A threshold value, indicated for example as Vx, is a measure of the amplitude of the sound signal variations; hence the threshold value is independent of the offset V0 or the polarity of the excursion. A threshold voltage, such as Vx+ or Vx−, is the actual voltage to which the sound signal is compared, including all polarity and offset effects. Threshold voltages are determined by adding or subtracting the threshold value from V0 thusly: Vx−=(V0−Vx) and Vx+=(V0+Vx). Here Vx is a threshold value or amplitude of excursions, V0 is the mean silent voltage or DC offset of the signal, and Vx− and Vx+ are termed the negative and positive threshold voltages respectively. Detecting a sound using the threshold value Vx includes: first determining V0; then calculating the threshold voltages Vx+ and Vx− from the known values of V0 and Vx; and then comparing the sound signal to the threshold voltages. A sound is detected when the associated sound signal exceeds a threshold voltage, and a sound signal exceeds a threshold voltage when the sound signal becomes either more positive than Vx+, or more negative than Vx−.

Comparing sound signals to a threshold voltage may include using analog electronics such as a voltage comparator. Or, more preferably, the sound signals may be digitized with an analog-to-digital converter and then compared to the threshold voltage using preprogrammed digital electronics. The digitized sound signals may also be analyzed by software, such as Fourier analysis, to evaluate the frequency spectrum occupied by the sound signals. Software may then emphasize sounds in the voiced frequency band and exclude sounds outside the voiced band. The spectral energy density of the sound may be calculated and integrated across the voiced frequency band, a sound being detected when the integrated energy exceeds a certain value.

The invention includes a detection rule for determining when the signals indicate the presence of a sound. Examples of detection rules are the Either-polarity rule and the Both-polarity rule. In the Either-polarity rule, a sound is detected whenever the sound signal is more positive than a threshold voltage Vx+ or more negative than a threshold voltage Vx−. In the Both-polarity rule, the sound signal must reach more positive than Vx+ and also more negative than Vx− before it is detected. The Either-polarity rule offers greater sensitivity, but the Both-polarity rule is better at rejecting impulse noises. The detection rule may further include requiring the sound signal to exceed the threshold voltage a certain number of times or for a certain amount of time, or any other requirements related to the sound signal. Often a different detection rule is used for each step in the command interpretation process.

The invention includes demarking certain time periods and detecting sound therein. Demarking a time period means measuring an interval with a specific starting time and a predetermined duration. However, the demarking may be aborted or re-started at any time before the time period has finished. Time periods may be demarked using analog electronics such as a monostable oscillator controlled by an R-C circuit. Or, more preferably, time periods may be demarked using digital means such as a crystal oscillator driving a counter that counts a predetermined number of clock oscillations and then generates an interrupt. Many microcontrollers provide both types of timers, as well as other timing options.

The inventive method includes selecting a responsive action according to how many separate voiced intervals are detected in the command. The invention may determine how many voiced intervals are in the command by counting the voiced intervals, or it may select the desired action without explicitly counting the voiced intervals. The voiced intervals may be counted by incrementing a counter, such as a register in a microcontroller, each time a non-voiced interval is followed by a detectable sound. The counter thus indicates how many separate voiced intervals have been detected, and a responsive action is then performed dependent on the number in the counter. Alternatively, the correct responsive action may be selected without such counting, but rather by changing a parameter when each successive voiced interval is detected. For example a device may produce an output voltage which is incremented in a stepwise fashion upon each voiced interval, the voltage at any moment being related to the number of voiced intervals detected so far. Or, the responsive actions may comprise program routines that are pointed to by a digital address pointer. The address pointer is then updated to point to a different routine when each voiced interval is detected, and whichever routine is pointed to at the end of the command is then executed. Or, data in a memory element may be modified when each voiced interval is detected, and the memory element is then read when the responsive action is performed.

Responsive actions generally include predetermined operations to be carried out or functions to be executed. What specifically comprises a responsive action, will depend on each application or embodiment. For example, a voice-activated counter may recognize a type-1 command such as “Count” which triggers a type-1 responsive action to increment a display number, and a type-2 command such as “Reset” which triggers a type-2 responsive action to reset the number to zero. The responsive action for a type-3 command may be to alternate between incrementing and decrementing modes. The responsive action may also be null, or simply proceeding with the next step in command interpretation.

The operations or functions comprising a responsive action can be changed at any time. A responsive action can change its own function, thereby modifying the responsive action for the current call or for subsequent calls of the same type. A responsive action can also change a different-type responsive action. For example, a stopwatch timer may start and stop timing upon each type-1 command such as “Start” or “Stop”. The type-1 responsive action comprises one of two routines, termed the starting function and the stopping function. The starting function is: “start timing, and then change the type-1 responsive action to the stopping function”. The stopping function is: “stop timing, and then change the type-1 responsive action to the starting function”. Thus upon each type-1 command, the timer alternately starts and stops timing, and it does so by changing the type-1 responsive action, alternating between the starting and stopping functions, upon each successive type-1 command.

A responsive action may include changing multiple responsive actions at once. For example, the type-3 command “reset all” could change the type-1 and type-2 responses back to their original factory-installed versions. A type-3 could also cause the responsive actions of type-1 and type-2 commands to be interchanged.

The responsive actions may be modified by any means that changes the operations or functions carried out by the responsive action. Such means will depend on the specific implementation. For example, when a responsive action includes executing preprogrammed instructions, those instructions could be changed when a particular responsive action is performed, thus one responsive action modifies another. Performing a responsive action may comprise executing code that an address pointer points to, and the pointer could be adjusted to point to different routines or different entry points, thereby modifying the responsive action. Performing a responsive action may include reading a memory element which is modified by a different responsive action. Many other ways to modify the responsive action are known.

The inventive method may demark an initial silent period of length Ts to ensure that prior sounds have subsided before accepting another command. During the Ts period, sound is detected using a threshold value Vs, and using a detection rule such as the Either-polarity rule. Thus a sound is detected during the Ts period whenever the sound signal reaches more positive than the threshold voltage Vs+=(V0+Vs) or more negative than Vs−=(V0−Vs). Whenever a sound is detected during the Ts period, the Ts period is again started over, and continues to do so until the full Ts interval finally expires with no further sounds detected. When the Ts period expires, the inventive method has ensured that prior commands and any other preceding noises have subsided. Vs must be high enough that electronic noise does not exceed the threshold voltages, but low enough to detect and reject any sounds that could be mistaken for commands. The exact value of Vs and the other thresholds will depend on the efficiency and noise figure of the microphone, the gain and bandwidth of the amplifier, and characteristics of the sound processor. As a starting point, Vs may be set to about 1.5 to 3 times the maximum sound signal excursion observed when no commands are uttered. The period Ts must be long enough to catch lingering noises, but not so long that the operation appears balky. Typically Ts is in the range 50 to 500 msec (milliseconds). The Vs and Ts values may be empirically adjusted for best performance in a particular embodiment and environment, for example by increasing Vs if background noises are interpreted as commands.

After the initial silent period Ts expires, the first voiced sound in the command is then detected when it is uttered. The first voiced sound is detected using a threshold value V1 and using a detection rule such as the Both-polarity rule. The sound signal is repeatedly compared to threshold voltages V1+ and V1−, and continuing until the sound signal has reached more positive than V1+ at least once and more negative than V1− at least once, at which time the sound is detected. The threshold value V1 is preferably higher than Vs because the sound signal exhibits larger voltage excursions during the voiced sound than during silence. However, V1 must be set low enough to ensure that voiced sound is reliably detected. Typically V1 is set to about 50% to 80% of the maximum signal excursion produced when the voiced sound of a type-1 command is uttered. If a command is missed, for example because a command is spoken too softly, then the overall sensitivity may be increased by reducing V1 or by increasing the gain of an amplifier. However V1 should not be made so low that background sounds are interpreted as commands.

After the first voiced interval has been detected, the next step is to detect the end of the first voiced interval. The end of a voiced interval is detected by waiting until the sound signal exhibits only silence or non-voiced sound, for a time period Ta, using a threshold value Va, and using a detection rule such as the Either-polarity rule. It is important to determine when the first voiced interval has ended, so that each separate voiced interval in the command may be identified. The end of the first voiced interval may be detected by demarking the period Ta and, if further sound is detected, re-starting the Ta period, and continuing to do so until Ta expires with no further sound therein. The lack of detectable sound for a time Ta indicates that the first voiced interval has finished. The Ta period must be long enough to ensure that the first sound pulse has completed, but not so long that the Ta period overlaps a second voiced interval in the command. The Ta period is the shortest non-voiced gap permitted between the voiced intervals in a type-2 command, since a command with any shorter gap would be construed as a single prolonged sound. Typically Ta is in the range 20 to 200 msec.

The threshold value Va is used during Ta to detect any remaining sounds from the first voiced interval. Va is preferably lower than V1 to ensure that the voiced interval is really finished when Ta expires. Va may be as low as Vs, the threshold value for the initial silent period. However, many commands include non-voiced consonant sounds between the voiced intervals, and the method treats all non-voiced sounds as silence. Any non-voiced sounds that exceed Va would be misidentified as voiced sounds; therefore Va must be high enough that the signal from non-voiced sounds does not exceed Va. Preferably Va is set about 1.5 to 2 times the signal excursion seen during non-voiced speech, but always higher than Vs, and always well below V1. If Ta is too short or Va is too high, type-1 commands will be misinterpreted as type-2. If Ta is too long or Va is too low, type-2 commands will be misinterpreted as type-1.

After the Ta period expires, a second voiced interval is then sought, by demarking a time interval Tg and using a threshold value V2 and using a detection rule such as Both-polarity. If any sound is detected during Tg, the command has a second voiced sound and thus is a type-2. If Tg expires with no further sound detected, then the command has only one voiced interval and thus is a type-1. The Tg period must be long enough that the second voiced sound of a type-2 command always begins within the time (Ta+Tg) after the first voiced interval. Typically Tg is about 100 to 1000 msec. The time (Ta+Tg) represents the longest allowable gap between the end of the first voiced interval and the beginning of the second voiced interval, since a command with a longer gap would be construed as two type-1 commands. The threshold value V2 may be the same as V1, but more preferably is set slightly lower than V1 to compensate for the tendency of most people to pronounce the second voiced sound of a type-2 more quietly than the first voiced sound. Typically V2 is set to about 70% to 90% of V1.

Typically the highest threshold value is V1, followed by V2 and then Va, with Vs being the lowest. For bipolar sound signals, the order of threshold voltages, from most negative to most positive, is:
V1−, V2−, Va−, Vs−, V0, Vs+, Va+, V2+, V1+ where V0 is the mean silent voltage.

While some applications are fully served by just type-1 and type-2 commands, other applications require a third responsive action, and thus require type-3 commands or higher. To detect a third voiced interval, it is necessary to detect the end of the second voiced interval and then to demark a time period in which the third voiced interval may occur. To do so, the Ta and Tg periods may be demarked again, as previously described, and they may be repeated again to detect as many voiced intervals as the application accepts. The threshold values and time periods for detecting a third voiced interval may be the same as those used for the second voiced interval. Or, different values may be used for detecting each of the voiced intervals in the command. For example the end of the first voiced interval may be detected using the threshold value Va1 during a time period Ta1, while the end of the second voiced interval may be detected using a different threshold value Va2 and a different period Ta2. Also the third sound may be detected using period Tg3 and threshold V3, differing from the corresponding parameters for the second voiced interval. Arranging different detection parameters for different sound periods is advantageous when the voiced intervals involve different sound levels or different gaps between the sounds of particular command words. The method accommodates these differences by adjusting Tg2 longer and Tg3 shorter, for example. Likewise the threshold V3 for detecting the third sound may be set to slightly less than V2 but still higher than Va. The lower threshold V3 will then reliably detect the third sound, despite its being spoken more softly than the others. It is quite easy to arrange as many different threshold values and time periods as desired for any particular application, using a microcontroller and some firmware code.

The invention includes a specific timing protocol to control when the responsive action is performed. Examples of such timing protocols include the Immediate, Delayed, and Gated timing protocols. In the Immediate timing protocol, a type-1 responsive action is performed as soon as the first voiced sound is detected, then a type-2 responsive action is performed if there is a second voiced sound, and then a type-3 responsive action is performed if there is a third voiced sound. Thus under the Immediate protocol, a type-2 command causes two responses in rapid succession: a type-1 followed momentarily by a type-2. For a type-3 command, all three responses are performed in rapid succession as each voiced interval is detected. It is sometimes useful to obtain such multiple responses in rapid succession, for example when several functions need to be triggered in a certain order.

In some applications, however, the user desires only a single response that corresponds correctly to the command type. Therefore the invention includes a Delayed protocol wherein only the requested response is performed, and it is performed after all of the Tg periods are finished. The advantage of the Delayed protocol is that only the requested action is performed, thus avoiding the rapid sequence of actions characteristic of the Immediate protocol.

In the Delayed protocol, certain acceleration options are possible by aborting unnecessary waiting times. For example, the final Tg period may be aborted as soon as a sound is detected therein, since at that time the command type is known. This acceleration option depends on the maximum command type, or maximum number of voiced sound intervals recognized by the application. For example, when an application accepts up to type-3 commands, then a type-3 responsive action may be performed as soon as the third voiced interval is detected, rather than waiting until the final Tg period elapses. However, for a type-2 command, the final Tg period must be allowed to expire.

Another acceleration option is to abort all remaining command processing whenever any Tg period expires without sound. For example, upon a type-1 command, the type-1 responsive action can be performed as soon as the first Tg period expires with no sound. It is not necessary to demark a second Tg period or any further Ta or Tg periods, because as soon as the first Tg expires empty, the command is known to be a type-1. In general, for an application that accepts up to type-N commands, the Delayed protocol can be accelerated by aborting the final Tg period when the N'th voiced interval is detected, and by aborting all further command processing as soon as any Tg period expires without sound.

Some applications require the speed of the Immediate protocol but the specificity of the Delayed protocol. Therefore the invention includes a Gated timing protocol that provides an essentially instantaneous response while complying with the command type. According to the Gated protocol, specificity is obtained by requiring that a command of one type must be preceded by a previous command of a different type, and any commands occurring in the wrong order are ignored. For example, a type-2 command could prepare or enable the application, and then a subsequent type-1 command could activate the desired response such as making a measurement. Any further type-1 commands are ignored as noise, until it is again reset by a type-2. To consider an embodiment, a pulser to trigger an oscilloscope can use the Gated protocol to ensure that one and only one fast pulse is generated, immediately when desired. The user simply calls a type-2 command to enable the pulser, and then a type-1 command to generate the pulse at a precise time, such as “Reset . . . go”. The first command is a type-2 that enables the device, and the second command is a type-1 that produces an immediate pulse, thereby allowing the user to capture a transient event. Any further type-1 commands or noise will be ignored until the pulser is again reset by a type-2. The Gated protocol allows the user to change switches or record data, without accidentally triggering another oscilloscope scan.

Sometimes it is desirable to obtain the type-1 response upon every command, for example to quickly check that the oscilloscope is triggering properly. The Gated protocol enables this by simply repeating the re-enabling command. Continuing with the oscilloscope pulser example, the user can obtain a series of trigger pulses quickly, by calling a series of type-2 commands such as "Reset . . . reset . . . reset". The first voiced interval in each of these commands elicits a fast type-1 response, which is to produce a pulse output. Then, when the second sound of each command arrives, a type-2 response is performed, which is to re-enable the device in preparation for the next command. Thus the user can obtain a single well-timed pulse by calling a type-2 command followed by a type-1 command, or a series of pulses by calling a series of type-2 commands, whichever type of performance is desired.

Operationally, the Gated protocol may be implemented in a number of ways. One implementation involves an internal gating parameter that can be set to one of two states, Enabling and Disabling. A suitable gating parameter may be a register in a microcontroller with 0 being Disabling and 1 being Enabling. Typically the gating parameter is set to Enabling by a type-2 command, and to Disabling by a type-1 command. Then a type-1 responsive action is performed only if the gating parameter is Enabling when the command occurs. This accomplishes the desired logic, since the type-1 responsive action is performed only after a type-2 command has first set the gating parameter to Enabling, and subsequent type-1 commands are ignored because the gating parameter is then Disabling.

Another way to implement the Gating protocol is to modify the type-1 responsive action upon each command. For example a responsive action may be controlled by a routine, such as a section of preprogrammed code, that can be modified. A type-1 command would carry out the current version of the routine, and then modify the routine in some way. A type-2 command would reverse the modification. For example a measurement device such as a voice-activated voltmeter using the Gating protocol could execute a routine upon a type-1 command that takes a voltage measurement, and then modifies the routine to bypass the voltage measurement thereafter. Upon a type-2 command, the routine is modified by removing the bypass, so that it can again make voltage measurements.

Another way to implement the Gating protocol is to use an address pointer that points to either an Enabling routine or a Disabling routine, and the pointed-to routine is executed by the type-1 responsive action. A type-2 command directs the pointer to the Enabling routine, while a type-1 causes a desired response such as a measurement, and then directs the pointer back to the Disabling routine. The user then gets the desired response by calling a type-2 followed by a type-1, and subsequent type-1 commands are ignored.

An advantage of the Gated protocol is that it allows a "measure-and-hold" operation, which is a big advantage when the user needs to retain the result of a measurement for later inspection. For example, a voice-activated digital caliper using the Gated protocol will allow the user to measure the size of something even when both hands are occupied, or in the dark, or when the readout is not in view. After commanding the caliper to make the measurement, the user can then remove the caliper and read the result at leisure. The main advantage of the Gated protocol is that it enables fast recording of an event or measurement, at a time of the user's choosing, with the result retained indefinitely for inspection or recording.

Normally the inventive method includes changing the detection sensitivity by varying threshold values. As an alternative, the gain of an amplifier may be varied while the threshold is held constant. High sensitivity is achieved during Ts by increasing the gain, and lower sensitivity for voiced interval detection by reducing the gain. From the user's point of view, there is no difference between these alternatives. The variable-threshold version is easier to implement.

DETAILED DESCRIPTION OF INVENTION

Figure 1:
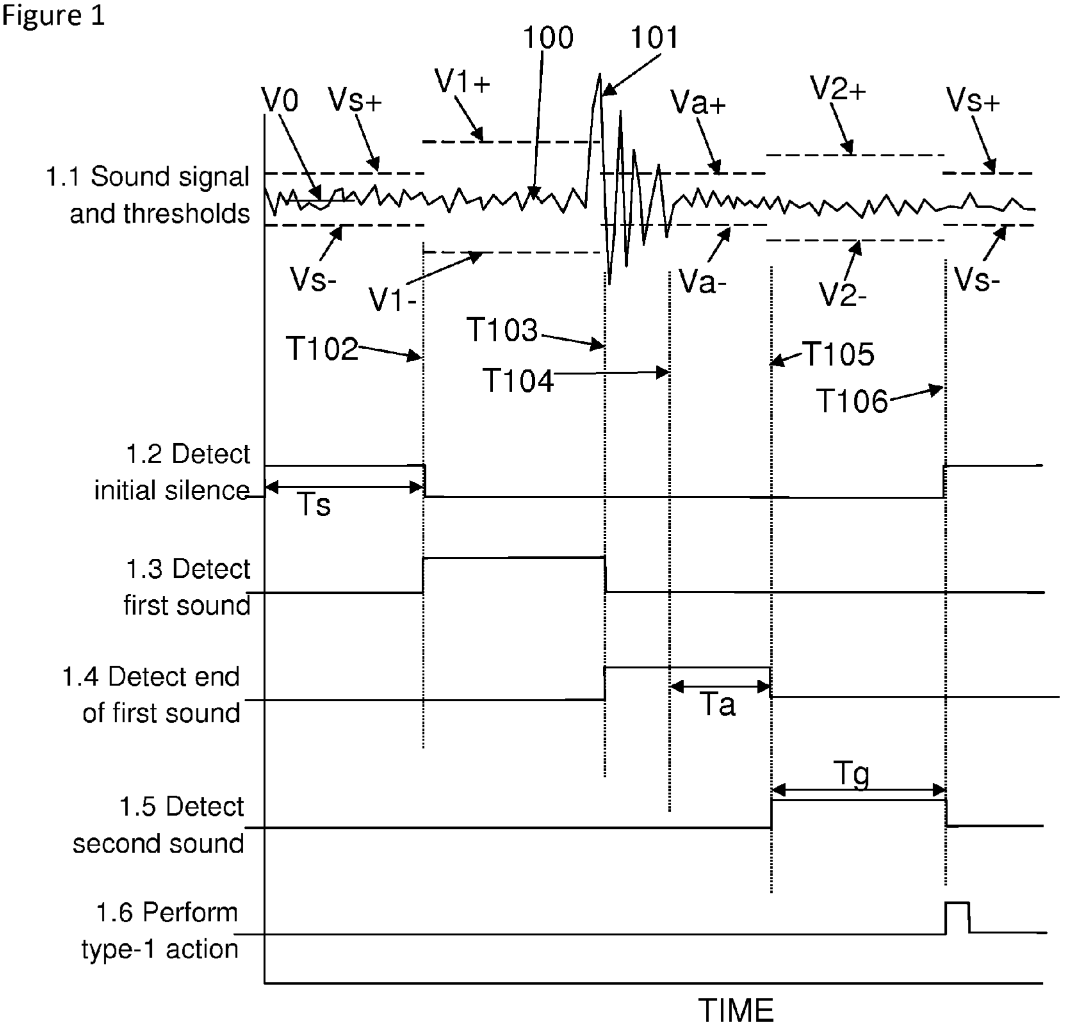
FIG. 1 is a chart showing a sound signal of a type-1 command versus time, and the various time periods involved in command interpretation.

FIG. 1 shows a series of graphs or traces, similar to oscilloscope traces, showing how the inventive method is used to interpret a type-1 command. The first trace in FIG. 1, labeled "1.1 Sound signal and thresholds", shows the amplified and filtered analog sound signal 100, with voltage on the vertical axis and time on the horizontal axis. The sound signal 100 is bipolar, not rectified, and thus exhibits both positive and negative excursions relative to the mean signal during silence. The voiced interval 101 of a type-1 command can be seen on the sound signal 100, as well as continuous low-amplitude variations due to electronic noise. Various threshold values are also shown as dashed horizontal lines. A solid horizontal line labeled V0 indicates the mean silent signal. Certain times are also indicated by vertical dotted lines.

The second trace in FIG. 1, labeled "1.2 Detect initial silence", shows a time period of length Ts which is demarked to determine that all prior sounds have ended. The invention uses a threshold value Vs to detect any remaining sounds, and uses the Either-polarity rule such that any excursion of the sound signal 100 above the voltage Vs+=(V0+Vs) or below Vs−=(V0−Vs) is detected as a sound. If any sound were detected during the Ts period, then the Ts period would have been restarted, continuing likewise until a full Ts period expires with no further sound detected. However, the sound signal 100 does not exceed either the Vs+ or Vs− threshold voltage during the silent time Ts, and so the silence requirement has been satisfied at the end of the Ts period at time T102.

Then, after the Ts period expires, a command sound is sought as shown in the trace labeled "1.3 Detect first sound". To detect the first voiced interval of a command, the threshold value is changed from Vs to V1, and the detection rule is changed from Either-polarity to Both-polarity. Then, the sound signal 100 is repeatedly compared to the threshold voltages V1+=(V0+V1) and V1−=(V0−V1). Typically V1 is greater than Vs, so that V1+ is more positive than Vs+, and V1− is more negative than Vs−, as can be seen in the dashed lines Vs+, Vs−, V1+, and V1− in trace 1.1. A low threshold is used for silence detection to ensure that backgrounds are excluded, while a higher threshold is used for voiced sound detection since the voltage excursions exhibited by voiced sound are much larger than those of relative silence. The Both-polarity rule is used for detecting voiced sound, thereby reducing any chance that background sounds may be counted as a command.

When a voiced interval 101 occurs, the sound signal 100 exceeds the V1+ threshold at the beginning of the voiced interval 101, and then exceeds the V1− threshold when the signal swings negative (relative to V0) at time T103. Since the Both-polarity rule is in force for voiced sound detection, the time of detection occurs not when the sound signal 100 first exceeds V1+, but rather when the sound signal 100 subsequently exceeds V1−. The detection time is thus T103 and is shown by a vertical dotted line. As mentioned earlier in the context of signal-threshold comparison, “exceed” means becoming more positive than a positive threshold such as V1+, or more negative than a negative threshold such as V1−.

After the voiced interval 101 is detected at time T103, the end of the voiced interval 101 is then detected by demarking a time interval Ta, as shown in the trace labeled “1.4 Detect end of first sound”. The threshold value Va is applied, and the Either-polarity rule is applied, while seeking the end of the voiced interval 101. Typically Va is lower than V1, to more clearly detect lingering voiced sound, but higher than the Vs thresholds, to avoid detecting non-voiced command sounds.

The Ta period is started as soon as the voiced interval 101 is detected. However, as shown in the sound signal 100, the voiced interval 101 continues for several more oscillations after T103. Therefore the Ta period is re-started upon every excursion exceeding Va+ or Va−. The last oscillation that exceeds Va+ or Va− occurs at time T104. Thereafter, a full Ta period is demarked, with no further sound being detected during the Ta period. Expiration of Ta without sound ensures that the voiced interval 101 is finished.

After Ta expires, at time T105, a time period Tg is then demarked as shown in the trace labeled “1.5 Detect second sound”, to detect a second voiced interval, if present. Also, the threshold V2 is used during Tg, with positive and negative threshold voltages of V2+=(V0+V2) and V2−=(V0−V2) respectively, and the Both-polarity rule is again applied. Typically V2 is chosen to be equal or slightly lower than V1, but substantially above Va, since the second voiced interval includes sound louder than non-voiced sound but often somewhat less loud than the first voiced interval of the command. During the Tg period, the sound signal 100 is repeatedly compared to the V2+ and V2− threshold voltages to detect a second sound, if present. The Tg period expires at time T106 with no further sound detected; hence the command in FIG. 1 has only one voiced interval and is a type-1 command.

When Tg expires at time T106, a type-1 responsive action is selected because the command was shown to have only one voiced sound interval. The type-1 responsive action is then performed as shown in the trace “1.6 Perform type-1 action”. The action is performed at the end of the Tg interval, according to the Delayed timing protocol. Then, another Ts silent period is begun, in preparation for another command.

The following table summarizes the time periods, functions, thresholds, and detection rules in each step of the command analysis of FIG. 1:

| Period | Function | Threshold voltage | Detection rule |
|---|---|---|---|
| Ts | wait for silent period | Vs+, Vs− | Either-polarity |
| undefined | detect first sound interval | V1+, V1− | Both-polarity |
| Ta | detect end of first sound interval | Va+, Va− | Either-polarity |
| Tg | detect second sound interval | V2+, V2− | Both-polarity |

Figure 2:
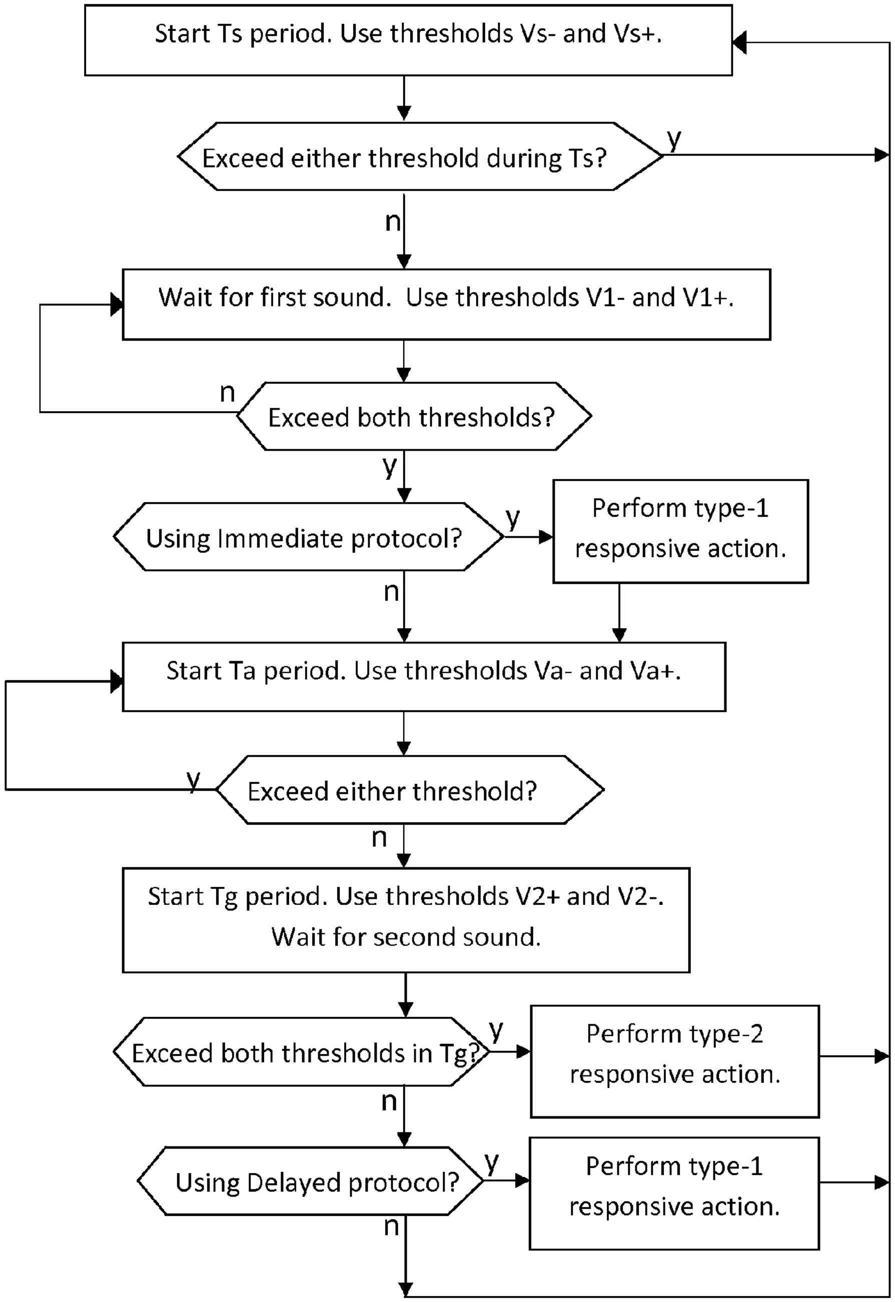
FIG. 2 is a flowchart showing the steps of the inventive method, corresponding to the temporal analysis of FIG. 1.

FIG. 2 is a flowchart showing the inventive method as a series of command processing steps. First, a period Ts of silence is waited for, using the Either-polarity rule and using threshold voltages Vs+ and Vs−. If any sound exceeds either threshold voltage during Ts, the Ts interval is started over, as shown by the interrogator labeled “Exceed either threshold during Ts?”, and continuing thus until Ts expires with no further sound detected.

Then, using the Both-polarity rule, and with threshold voltages V1+ and V1−, the first voiced sound interval is detected when it occurs. As soon as the signal has exceeded both V1+ and V1−, the first voiced interval is detected. If the Immediate protocol is in use, the type-1 responsive action is performed at that time.

Then, the end of the first voiced interval is detected by waiting for a period Ta wherein only silence or non-voiced sounds are present. Using the Either-polarity rule with threshold voltages Va+ and Va−, the Ta period is restarted repeatedly as long as sound exceeding either Va+ or Va− is detected. Continuing until Ta expires with no further sound detected, the expiration of Ta indicates that the first voiced interval has finished.

Then, a second voiced interval is detected if present. Again using the Both-polarity rule, but changing to the threshold voltages V2+ and V2−, a time period Tg is demarked. If a second sound is detected within Tg, then the type-2 responsive action is performed. If Tg expires without further sound detected, and if the Delayed timing protocol is being used, then the type-1 responsive action is performed at the end of Tg.

Then, returning back to the start, another Ts silent period is demarked in preparation for another command.

Figure 3:
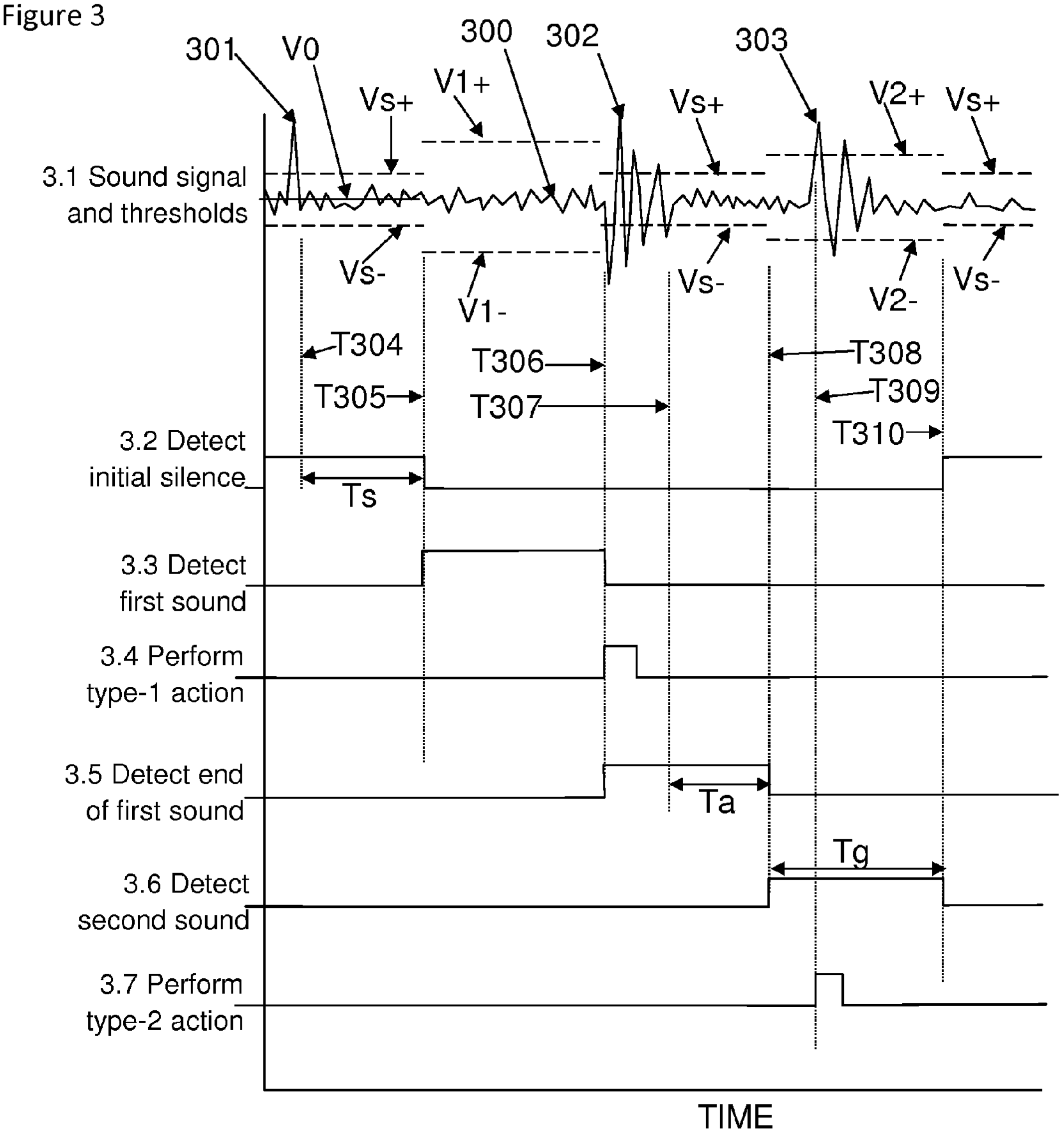
FIG. 3 is a chart showing the sound signal and analysis steps for a type-2 command.

FIG. 3 is a chart showing how a type-2 command is analyzed and noise is excluded using the inventive method. The maximum command type accepted is type-2 in the example of FIG. 3. The sound signal 300 is shown in the first trace, labeled “3.1 Sound signal and thresholds” versus time. The sound signal 300 includes a noise pulse 301, a first voiced interval 302, and a second voiced interval 303. Threshold voltages are again shown as dashed horizontal lines, the mean sound signal during silence is a line labeled V0, and certain times are indicated by vertical dotted lines.

First, as shown in trace “3.2 Detect initial silence”, a period Ts is demarked and threshold voltages Vs+ and Vs− are used with the Either-polarity rule for detection of sound. The noise pulse 301 occurs and is detected; however since the Ts period is in progress, the noise pulse 300 is not treated as a command, but is ignored as noise and the Ts period is aborted. Then when the sound signal 300 returns below Vs+, at time T304, the Ts interval is again demarked starting at T304. No further detectable sound occurs during the full Ts period which ends at T305.

As indicated by the trace labeled “3.3 Detect first sound”, after the Ts interval expires, at time T305, the threshold voltages V1+ and V1− are then used to detect the first voiced interval 302. In the example of FIG. 3, the Either-polarity criterion is used for sound detection as well as silence detection. The first voiced interval 302 is detected at time T306 when the sound signal 300 first exceeds V1−. V1− is a negative threshold voltage relative to V0, hence the sound signal 300 exceeds the threshold voltage when the sound signal 300 becomes more negative than V1−.

The example of FIG. 3 assumes the Immediate timing protocol, so a type-1 responsive action is performed as soon as the first voiced interval 302 is detected at time T306. This is shown in the trace labeled "3.4 Perform type-1 action".

Also at time T306, the Ta period is started, and is then repeatedly re-started as long as the first voiced interval 302 exceeds either Vs+ or Vs−, as indicated in the trace labeled "3.3 Detect end of first sound". In the example of FIG. 3, the same threshold value Vs is used for the initial silent period and for detecting the end of the voiced interval 302. Then, at time T307, the sound signal 300 ceases to exceed either the Vs+ or Vs− thresholds, and the full Ta period is demarked between times T307 and T308, during which time the sound signal 300 remains below the thresholds and no further sound is detected. Expiration of Ta indicates that the first voiced interval 302 is finished.

At the end of the Ta period, at time T308, a period Tg is then demarked in which further voiced sound is detected, if present. The Tg interval spans from time T308 to T310, as shown in the trace labeled "3.6 Detect second sound". A second voiced interval 303 indeed arrives at time T309 when the sound signal 300 exceeds the V2+ threshold. The command is then known to be a type-2, since a second voiced interval 303 was detected, and recalling that the application accepts only up to type-2 in this example. Thus a type-2 responsive action is performed at T309, as shown in the trace labeled "3.7 Perform type-2 action".

After the Tg period is finished, at time T310, the next Ts silent period is then sought as indicated in trace 3.2. Optionally, to reduce unnecessary delays, the Tg period may be aborted and the next Ts period may be started as soon as a second voiced interval 303 is found at T309, rather than waiting until T310 when the Tg period expires.

Figure 4:
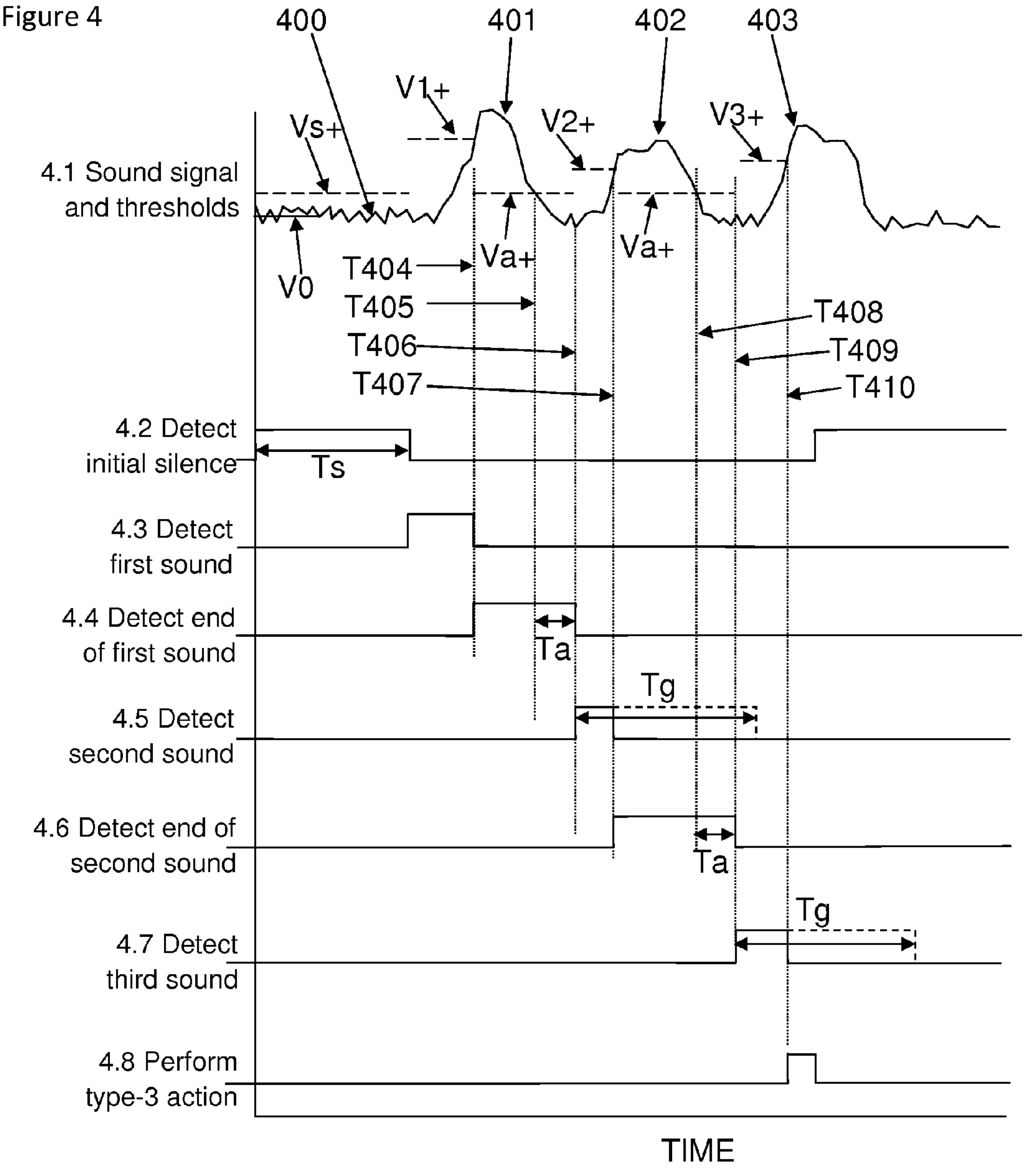
FIG. 4 is a chart showing the sound signal for a type-3 command, with rectification and smoothing and alternate analysis.

FIG. 4 is a chart showing the sound signals, thresholds, and timer intervals related to a type-3 command. The application in this example is assumed to accept commands only up to type-3, so that a type-3 responsive action may be performed as soon as three voiced sounds are detected. Sound signals are rectified and unipolar (positive relative to V0), so only positive threshold voltages are used.

The trace labeled "4.1 Sound signal and thresholds" shows the sound signal 400 after being rectified and smoothed. The horizontal axis is time, and the vertical axis is the rectified sound signal voltage, which is also a measure of the sound amplitude within the vocal frequency band. The trace 4.1 illustrates a type-3 command having three voiced intervals 401, 402, and 403 separated by intervals of substantially less sound.

In the trace labeled "4.2 Detect initial silence", a period of silence is first detected by demarking a time interval Ts and applying a threshold voltage Vs+. Since no sound is detected during Ts, the expiration of Ts ensures that prior commands have finished.

Then, in the trace labeled "4.3 Detect first sound", a threshold voltage V1+ is applied, and the first voiced interval 401 is detected at time T404.

Then, in the trace labeled "4.4 Detect end of first sound", the end of the first voiced interval 401 is found by demarking a time period Ta and applying the threshold voltage Va+. The Ta period is repeatedly re-started while the sound signal 400 exceeds Va+. At time T405, the sound signal 400 remains below Va+, and the Ta period expires at time T406. Expiration of Ta indicates that the first voiced interval 401 has finished.

In the trace labeled "4.5 Detect second sound", a second voiced interval 402 is sought within a period Tg that starts at time T406 when Ta expires. A second voiced interval 402 then occurs and is detected at time T407, when the sound signal 400 exceeds the threshold V2+. At time T407, the Tg period is aborted because of the detection of the voiced interval 402 at that time. If, on the other hand, there were no second sound, the full Tg period would have been demarked, as indicated by a dashed line in trace 4.5.

The trace labeled "4.6 Detect end of second sound" shows the end of the second sound 402 being found, by repeatedly demarking the Ta period until, between T408 and T409, the Ta period proceeds with no further sound therein.

Then, another Tg period is demarked and a third voiced interval 403 is sought, as shown in the trace labeled "4.7 detect third sound". The Tg period is again aborted when the third sound 403 exceeds threshold V3+ at time T410. The full Tg period is again indicated as a dashed line.

Then, at time T410, the type-3 responsive action is performed. There is no need to wait until the end of the last Tg time interval because the maximum number of voiced intervals has already been detected, and therefore it is known that the command is a type-3.

The next Ts period is started, in preparation for the next command, as soon as the type-3 responsive action has completed. In some applications, the next Ts period may be started at time T410, before the type-3 responsive action has finished. In other applications, the full Tg period may be allowed to expire, only then starting the next Ts period. Depending on the application, it may be necessary to withhold the Ts period until after the responsive action is finished, since this ensures that any further commands are inhibited until after all of the ongoing actions are finished.

A variation of the example of FIG. 4 involves the threshold detection rules. To reject noise, it may be useful to accept a sound only after the signal has exceed the threshold voltage for a certain amount of time, which may be termed the assert time. If the sound signal exceeds the threshold voltage, but then drops below the threshold before the assert time is up, the excursion is ignored as noise. The assert time requirement will reject certain types of noise without missing command sounds, so long as the assert time is shorter than the shortest duration of a voiced interval in a valid command. In practice, it may be necessary to reduce the threshold value when the assert time requirement is imposed.

Figure 5:
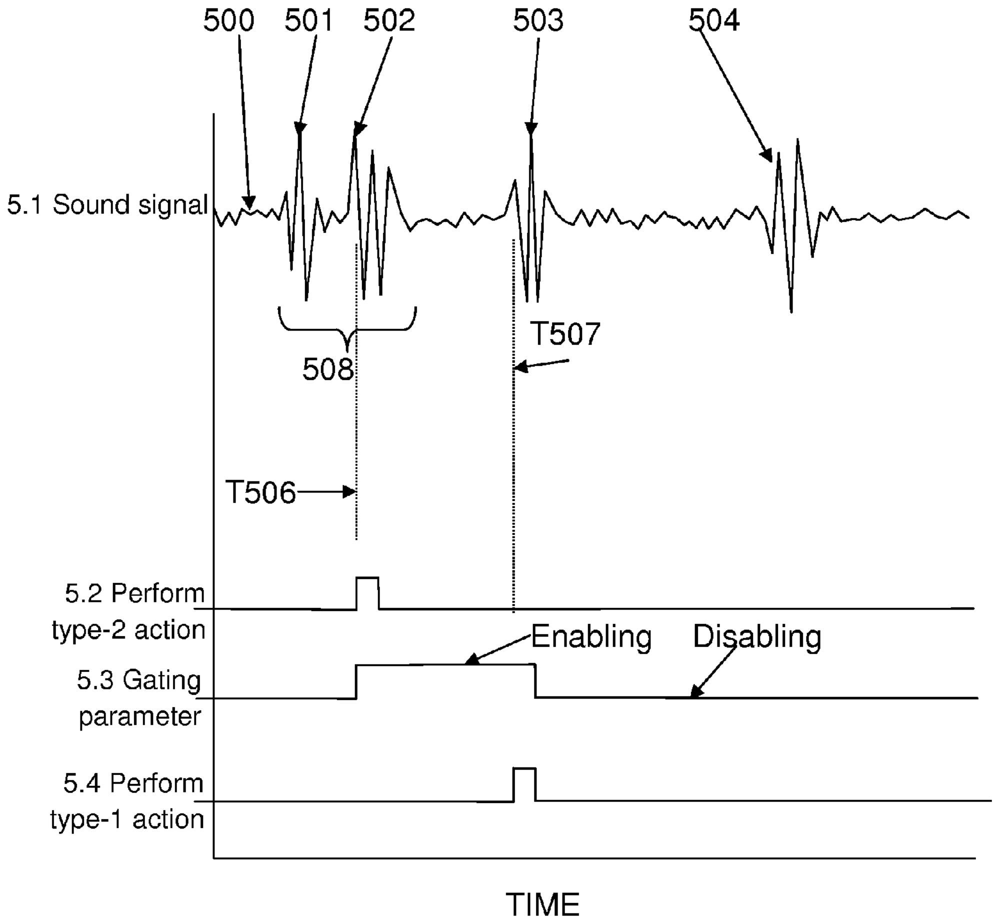
FIG. 5 is a chart showing the sound signal and command response according to the Gated timing protocol.

FIG. 5 shows the analysis of commands using the inventive method and using the Gated timing protocol. Here an internal parameter, the gating parameter, can be set to Enabling or Disabling. According to the Gating protocol, a type-1 responsive action can be performed only when the gating parameter is Enabling, and then the parameter switches to Disabling. The gating parameter is again set to Enabling by a type-2 command. As an example, the type-1 action may comprise emitting a trigger pulse or making a measurement, but it is performed only when the gating parameter is set to Enabling. When the gating parameter is set to Disabling, the type-1 responsive action is inhibited.

In the trace labeled "5.1 Sound signal" a sound signal 500 is shown including a type-2 command 508 comprising a first voiced interval 501 and a second voiced interval 502. This is followed by a type-1 command with a voiced interval 503, and then later by a second type-1 command with a voiced interval 504.

The trace labeled "5.2 Perform type-2 action" shows that the type-2 action is performed at time T506, as soon as the second voiced interval 502 of the type-2 command 508 is detected. The type-2 action 508 is to make the gating parameter Enabling.

The trace labeled "5.3 Gating parameter" shows the status of the gating parameter versus time. The trace 5.3 is high when the gating parameter is in the Enabling state, and low when the gating parameter is Disabling. Initially the gating parameter is in the Disabling state. The gating parameter then becomes Enabling (high) at time T506 because it was reset by the type-2 responsive action at T506.

In the trace labeled "5.4 Perform type-1 action", a type-1 responsive action is performed at time T507 when the voiced interval 503 is detected. Since the voiced interval 503 is detected while the gating parameter is Enabling, the type-1 responsive action is performed at that time T507. The gating parameter is then reverted to the Disabling state as soon as the type-1 responsive action is complete.

Another sound 504 occurs thereafter, comprising either noise or a random voiced interval or another type-1 command. However, no action is performed responsive to the sound 504 because the gating parameter is Disabling when the sound 504 occurs. Thus the example of FIG. 5 shows a single type-1 responsive action when a type-1 command 503 follows a type-2 command 508, and no response to type-1 commands or noise 504 thereafter, as required.

Figure 6:
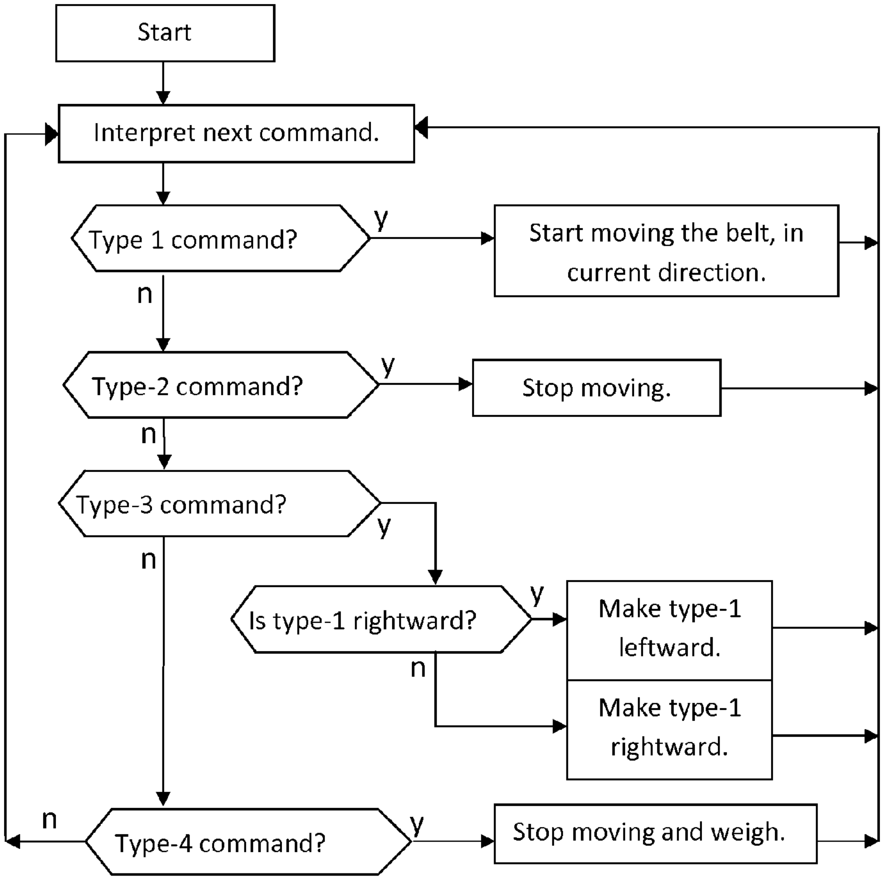
FIG. 6 is a flowchart showing the steps in processing commands according to the Gated protocol.

FIG. 6 shows a flowchart for an implementation of the invention wherein one type of responsive action modifies another type of responsive action. The example application is a voice-controlled conveyor belt that positions a package on a weighing station by moving left or right under voice control. Type-1 commands start the conveyor belt motion in whichever direction the type-1 responsive action is set to, and a type-2 command stops the motion. Type-3 commands alternately change the direction of motion to be left or right, by changing the type-1 responsive action accordingly.

Initially, at the box in FIG. 6 labeled "Start", the package arrives at an arbitrary position on the belt, and the operator commands the belt to move or stop or change direction. In the box labeled "Interpret next command", voice commands are interpreted by counting the number of voiced intervals in the command, and the command type is thus determined. If the command is a type-1, as indicated in the interrogator labeled "Type-1 command?", the belt starts moving, either left or right, depending on the current type-1 responsive action. The belt starts moving rightward if the type-1 responsive action is for rightward motion, or leftward if the type-1 responsive action is for leftward motion.

If the command is a type-2, the belt stops. For a type-3 command, the type-1 responsive action is changed to leftward if it is currently rightward, and vice versa, as indicated by the boxes labeled "Make type-1 leftward" and "Make type-1 rightward". Upon a type-4 command, the belt is stopped if it is moving, and the weight of the package is finally measured, as indicated in the box "Stop moving and weigh". If the command is none of these types, then it is ignored as noise. After each operation, the process cycles back to wait for the next command.

Figure 7:
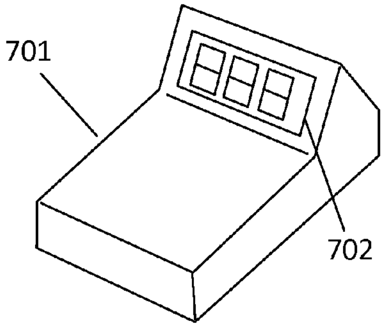
FIG. 7 illustrates useful applications enabled by the inventive method.
Figure 7:
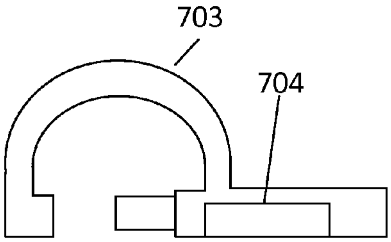
Figure 7:
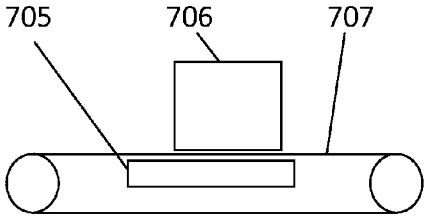
Figure 7:
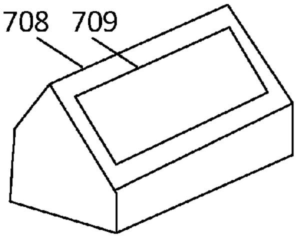
Figure 7:
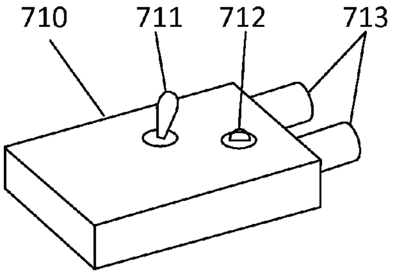
Figure 7:
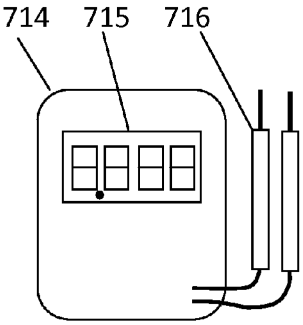

FIG. 7 shows a variety of new voice-activated devices that the inventive method enables. The devices in FIG. 7, and many other voice-activated products with few specific response functions, would not be economically feasible without the inventive method, due to the cost and complexity of current speech recognition systems. In addition, some of the devices of FIG. 7 depend on a rapid response, and thus would not be technically feasible with prior art, due to the time required for speech recognition systems to interpret commands. The inventive method makes these and many other applications economically accessible and technically feasible, indeed straightforward, for the first time.

FIG. 7*a* shows an event counter 701 that uses the inventive method to increment a count upon each type-1 command and reset upon each type-2 command. The counting result is shown in a display 702. Upon a type-3 command, the counter 701 transmits the counting result wirelessly to a remote computer (not shown). The inventive method enables a completely voice-controlled operation in a compact economical system. Prior art speech recognition systems could perform the same functions, but only with a much more powerful computer and software, or with a radio link to a remote supercomputer, and at vastly greater expense. The inventive method, on the other hand, is easily implemented in an extremely low-cost microcontroller, thereby performing all of the counter functions as well as true speaker universality, and without the expense, complexity, need for training, and frustration of a full-performance speech-recognition system.

FIG. 7*b* shows a voice-controlled caliper 703 with a digital display 704. The caliper 703 uses the Gated protocol, wherein the caliper 703 performs a size measurement responsive to a type-1 command, but only following a type-2 command. An advantage of the inventive method for this application is that it allows the user to control the timing of a difficult measurement using just voice commands. A particular advantage of the Gated protocol is that it allows the user to focus on positioning the caliper 703 for the measurement, and then read the result in the display 704 thereafter.

FIG. 7*c* shows a voice-activated weighing station 705 that weighs a package 706 on a conveyor belt 707. A type-1 command makes the belt 707 move forward, alternately starting and stopping the forward motion upon subsequent type-1's. A type-2 makes the belt 707 back up, again alternately starting and stopping on command. A type-3 causes the weighing station 705 to weigh the package 706.

FIG. 7*d* shows an interval timer 708 that uses the inventive method as a voice-activated stopwatch. The timer 708 starts and stops timing upon type-1 commands, and displays the time interval with a 7-segment LED display 709. Upon a type-2 command, the time is reset to zero. Upon a type-3 command, the device alternates between a holding mode and a running mode. Such a timer must have a very fast command response; otherwise the time measurement would be useless. Speech recognition systems are unable to provide fast responses because (a) they take time to analyze the command, and (b) they cannot provide the response until after the command is finished. The inventive method provides a virtually instantaneous response by performing the type-1 responsive action when the very first sound wave of a command is detected (in Immediate and Gated protocols, with the Either-polarity rule), thereby providing the speed needed for precise timing.

FIG. 7*e* shows a pulse generator 710 that can trigger an oscilloscope or voltmeter or other triggerable instrument (not shown). The pulse generator 710 includes a three-position toggle switch 711 and an indicator 712 and output connectors 713 such as BNC connectors. The triggering application requires very fast response times, but without false triggering. The pulse generator 710 therefore can be switched between Immediate, Delayed, and Gated pulsing modes using the switch 711. In the Immediate mode, the pulse generator produces a pulse upon each type-1 command. In the Delayed mode, a pulse is produced on one of the connectors 713 for a type-1 command, and a different pulse is produced on the other connector for a type-2 command, but only after command processing is complete. In the Gated mode, a type-2 command enables the unit but produces no output, and then a subsequent type-1 command produces an instantaneous pulse output, with any further type-1 commands being ignored until the pulse generator 710 is re-enabled by another type-2 command. The indicator 712 illuminates whenever the pulse generator 710 is enabled for type-1 commands.

FIG. 7*f* shows a voltmeter 714 that measures a voltage using the probes 716 and displays the measurement on a display 715. Using the inventive method, the voltmeter 714 can make measurements one at a time, or continuously, as desired by the user. Upon a type-1 command, the voltmeter 714 makes a single voltage measurement and then shows the result in the display 715. Upon the next type-1 command, the voltmeter 714 makes another measurement and updates the display 715. Upon a type-2, the voltmeter 714 begins measuring continuously and updating the display continuously, continuing to do so until being stopped by a type-1. In this way the user can select either a continuously updated reading like a conventional voltmeter, or a sample-and-hold operation with timing determined entirely by a voice command. Upon a type-3 command, the voltmeter 714 readjusts the null or baseline voltage.

All of the applications illustrated in FIG. 7, as well a multitude of other applications (voice-controlled temperature monitor, voice-controlled robotics, voice-controlled security doors, voice-controlled computer interfaces, to mention just a few) involve only two or three specific operations for which voiced interval analysis is sufficient and economical, but for which the full speech recognition systems would be inappropriate. The applications illustrated in FIGS. 7*a*, 7*b*, and 7*c* are enabled by the inventive method due to the low cost involved in interpreting spoken commands using the inventive method. Although a full speech recognition system could be implemented for these examples, the cost would be prohibitive. The applications of FIGS. 7*d*, 7*e*, and 7*f* on the other hand require a fast, near-instantaneous response to catch a transient event. These latter three applications could not be implemented using speech recognition at any price, because it is too slow. The inventive method, on the other hand, provides a near-instantaneous functionality, more than sufficient for the applications shown. When the application involves a transient event, only the inventive method provides means for performing a time-critical measurement promptly and reliably.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

The invention claimed is:

1. A method for interpreting a spoken command by detecting voiced intervals and non-voiced intervals in the spoken command, and for performing a type-1 responsive action if the command has exactly one voiced interval, and for performing a type-2 responsive action if the command has two voiced intervals separated by a non-voiced interval, a voiced interval being a time interval containing voiced sound, and a non-voiced interval being a time interval that has no voiced sound therein, said method comprising the steps:

(3a) converting sound waves into an electrical sound signal, and comparing the sound signal to a threshold voltage, a sound being detected when the sound signal exceeds the threshold voltage, and no sound being detected while the sound signal remains below the threshold voltage;

(3b) detecting a first voiced interval when the sound signal exceeds a threshold voltage V1+;

(3c) then, determining when the first voiced interval has ended by waiting until the sound signal remains below a threshold voltage Va+ throughout a time period Ta;

(3d) then, detecting a second voiced interval if the sound signal exceeds a threshold voltage V2+ during a time period Tg;

(3e) then, performing the type-1 responsive action if the sound signal remains below V2+ throughout Tg, and performing the type-2 responsive action if the sound signal exceeds V2+ during Tg.

2. The method of claim 1 which additionally includes performing a type-3 responsive action when the spoken command includes three voiced intervals, said method including the steps of:

(4a) after detecting the second voiced interval, determining when the second voiced interval has ended by waiting until the sound signal remains below a threshold voltage Va2+ throughout a time period Ta2;

(4b) then, performing the type-3 responsive action if the sound signal exceeds a threshold voltage V3+ within a time period Tg3.

3. The method of claim 2 which further includes incrementing a counter when each voiced interval is detected, and then performing the type-1 or type-2 or type-3 responsive action depending on how many counts are in the counter.

4. The method of claim 1 which further includes a step, before detecting the first voiced interval, of ensuring that any prior sounds have ended by waiting until the sound signal remains below a threshold voltage Vs+ for a time period Ts.

5. The method of claim 4 wherein the threshold voltage Vs+ is set to be above a sound signal corresponding to silence but below Va+, and Va+ is set to be above a sound signal corresponding to non-voiced sounds but below V2+, and V2+ is set to be below a sound signal corresponding to the second voiced interval, and V1+ is set to be above V2+ but below a sound signal corresponding to the first voiced interval.

6. The method of claim 1 which further includes amplifying and filtering the sound signal to emphasize sounds in a frequency band corresponding to voiced sounds, and to suppress sounds outside that frequency band.

7. The method of claim 1 which further includes rectifying and then low-pass filtering the sound signal to produce a smoothed unipolar sound signal, and then comparing the smoothed unipolar sound signal to a threshold voltage.

8. The method of claim 1 wherein detecting a sound includes comparing the sound signal to two threshold voltages V1+ and V1−, with V1+ being more positive than V1−, a sound being detected whenever the sound signal is more positive than V1+ or more negative than V1−.

9. The method of claim 1 wherein detecting a sound includes comparing the sound signal to two threshold voltages V1+ and V1−, with V1+ being more positive than V1−, a sound being detected as soon as the sound signal has become more positive than V1+ at least once and more negative than V1− at least once.

10. The method of claim 1 wherein performing a responsive action includes modifying a responsive action.

11. The method of claim 1 wherein performing the type-1 responsive action includes modifying the type-2 responsive action, and performing the type-2 responsive action includes modifying the type-1 responsive action.

12. The method of claim 1 wherein performing a responsive action causes the type-1 and type-2 responsive actions to be interchanged.

* * * * *